(12) United States Patent
Waldridge

(10) Patent No.: US 12,535,144 B2
(45) Date of Patent: Jan. 27, 2026

(54) FLUID CONTROL VALVE MODULE

(71) Applicant: Eva Medtec, Inc., Bloomington, MN (US)

(72) Inventor: Irene Waldridge, Shakopee, MN (US)

(73) Assignee: Eva Medtec, Inc., Bloomington, MN (US)

( * ) Notice: Subject to any disclaimer, the term of this patent is extended or adjusted under 35 U.S.C. 154(b) by 210 days.

(21) Appl. No.: 18/124,206

(22) Filed: Mar. 21, 2023

(65) Prior Publication Data

US 2023/0279959 A1 Sep. 7, 2023

Related U.S. Application Data

(63) Continuation-in-part of application No. 16/435,446, filed on Jun. 7, 2019, now Pat. No. 11,607,363, which is a continuation-in-part of application No. 15/224,330, filed on Jul. 29, 2016, now Pat. No. 11,090,216.

(Continued)

(51) Int. Cl.
*F16K 11/083* (2006.01)
*F15B 13/04* (2006.01)
*F16K 27/06* (2006.01)

(52) U.S. Cl.
CPC ...... *F16K 11/0833* (2013.01); *F15B 13/0406* (2013.01); *F16K 27/062* (2013.01)

(58) Field of Classification Search
CPC .. F16K 11/083; F16K 11/0833; F16K 27/062; F16K 37/0041
See application file for complete search history.

(56) References Cited

U.S. PATENT DOCUMENTS 706,928 A 8/1902 Graham
4,583,255 A 4/1986 Mogaki et al.
(Continued)

FOREIGN PATENT DOCUMENTS

CA 2282101 A1 3/2000
CN 202822057 U 3/2013
(Continued)

OTHER PUBLICATIONS

US 7,534,214 B2, 05/2009, Dehli (withdrawn)

*Primary Examiner* — Eric Keasel
(74) *Attorney, Agent, or Firm* — Dicke, Billig & Czaja, PLLC

(57) ABSTRACT

A valve assembly for select distributed discharge of received fluid in a predetermined manner is generally provided. The assembly includes a manifold and a rotatable valve body. The manifold has an internal chamber, a fluid ingress passage for receipt of fluid, and a plurality of fluid discharge conduits. The fluid ingress passage and fluid discharge conduits are in fluid communication with the internal chamber. A first internal chamber section is characterized by the fluid ingress passage with a second internal chamber section characterized by ingress portions of the fluid discharge conduits. The valve body is adapted to be sealingly seated within the internal chamber so as to fluidly isolate the internal chamber sections, and includes a bore axially extending inwardly from a first end thereof for receipt of fluid from the fluid ingress port of the manifold, and a fluid egress passage in fluid communication with the bore for passage of received fluid to a select fluid discharge conduit of the fluid discharge conduits.

12 Claims, 6 Drawing Sheets

Related U.S. Application Data

(60) Provisional application No. 62/199,036, filed on Jul. 30, 2015.

(56) References Cited

U.S. PATENT DOCUMENTS

| | | | |
|---|---|---|---|
| 5,046,522 A | 9/1991 | Le Devehat et al. |
| 5,267,364 A | 12/1993 | Volk |
| 5,807,290 A | 9/1998 | Barry |
| 5,815,865 A | 10/1998 | Washburn |
| 5,893,184 A | 4/1999 | Murphy |
| 5,976,099 A | 11/1999 | Kellogg |
| 6,179,796 B1 | 1/2001 | Waldridge |
| 6,361,512 B1 | 3/2002 | Mackay |
| 6,643,875 B2 | 11/2003 | Boso et al. |
| 6,645,165 B2 | 11/2003 | Waldridge et al. |
| 6,687,935 B2 | 2/2004 | Reeder et al. |
| 6,860,862 B2 | 3/2005 | Waldridge et al. |
| 6,952,852 B2 | 10/2005 | Reeder et al. |
| 6,966,884 B2 | 11/2005 | Waldridge et al. |
| 7,604,606 B2 | 10/2009 | Dehli |
| 7,849,545 B2 | 12/2010 | Flocard |
| 8,021,313 B2 | 9/2011 | Dehli |
| 8,052,630 B2 | 11/2011 | Kloecker et al. |
| 8,167,856 B2 | 5/2012 | Kazala, Jr. et al. |
| 8,418,296 B1 | 4/2013 | Hanlon et al. |
| 8,745,796 B2 | 6/2014 | Liu |
| 8,753,383 B2 | 6/2014 | Parish et al. |
| 8,863,338 B2 | 10/2014 | Dzioba et al. |
| 8,893,338 B2 | 11/2014 | McCausland et al. |
| 8,966,689 B2 | 3/2015 | McGuire et al. |
| 9,015,885 B2 | 4/2015 | Chapin |
| 9,119,760 B2 | 9/2015 | Purdy |
| 2004/0210176 A1 | 10/2004 | Diana |
| 2004/0226103 A1 | 11/2004 | Reger |
| 2007/0088239 A1 | 4/2007 | Roth |
| 2008/0082029 A1 | 4/2008 | Diana |
| 2009/0270774 A1 | 10/2009 | Gowda |
| 2009/0299239 A1 | 12/2009 | Meyer |
| 2010/0026064 A1 | 2/2010 | Marsden |
| 2011/0314612 A1 | 12/2011 | Hsu |
| 2012/0079662 A1 | 4/2012 | Dzioba |
| 2013/0000047 A1 | 1/2013 | McCann et al. |
| 2013/0042413 A1 | 2/2013 | Cao |
| 2013/0085431 A1 | 4/2013 | Malhi |
| 2014/0007353 A1 | 1/2014 | Stryker |
| 2015/0148196 A1 | 5/2015 | Hanks et al. |
| 2016/0081488 A1 | 3/2016 | Zhang |

FOREIGN PATENT DOCUMENTS

| | | |
|---|---|---|
| EP | 0986999 A2 | 3/2000 |
| JP | 2000-185081 A | 7/2000 |
| JP | 2000-237256 A | 9/2000 |
| JP | 2008-073185 A | 4/2008 |
| JP | 2008-113889 A | 5/2008 |
| JP | 4258209 B2 | 4/2009 |
| WO | 2004037149 A1 | 5/2004 |
| WO | 2012009739 A1 | 1/2012 |
| WO | 2014194756 A1 | 11/2014 |

FLUID CONTROL VALVE MODULE

The instant utility application is a continuation-in-part of U.S. application Ser. No. 16/435,446, entitled DIVERTER FOR USE IN THERAPEUTIC MASSAGE SYSTEM, filed Jun. 7, 2019 and issuing as U.S. Pat. No. 11,607,363 which in turn is a continuation-in-part of U.S. application Ser. No. 15/224,330, entitled THERAPEUTIC MASSAGE SYSTEM, filed Jul. 29, 2016, which claims priority to U.S. Provisional Appl. No. 62/199,036 filed Jul. 30, 2015, the entireties of each application incorporated herein by reference.

TECHNICAL FIELD

The present disclosure is directed to a valve assembly, more particularly, to a fluid control valve module, more particularly still, to a compact, quiet, reliable fluid control valve module for selective distributed discharge of a pressurized fluid received by such device.

BACKGROUND

Numerous applications require and/or benefit from a systematic regulated delivery of a pressurized fluid, more particularly, a systematic regulated distributed delivery of a pressurized fluid. Notionally and contextually, an area ripe for improved systematic regulated distributed delivery of a pressurized fluid is characterized by on/off pressurization of portions of a work piece. For instance, in an n-portion work piece scenario, one or more portions may beneficially receive a charge of pressurized fluid, and thusly be pressurized, while one or more other portions may beneficially cease receipt of a charge of pressurized fluid, and thusly cease being pressurized.

Both industrial and commercial work pieces are advantaged by heretofore known mechanisms to effectuate a systematic regulated distributed delivery of a pressurized fluid. That said, it is believed desirable and advantageous to target finessed applications in these areas for improvement. For example and without limitation, a small, compact, fully automated and controllable mechanism characterized by reliable repeatable operation, minimal parts and quiet operation for precise systematic regulated distributed delivery of a pressurized fluid are generally sought.

SUMMARY

A valve assembly for select distributed discharge of received fluid in a predetermined manner is generally provided. The contemplated assembly, in all its embodiments includes at least a manifold and a rotatable valve body.

The manifold has an internal chamber, a fluid ingress passage for receipt of fluid, and a plurality of fluid discharge conduits. The fluid ingress passage and fluid discharge conduits are in fluid communication with the internal chamber. A first internal chamber section is characterized by the fluid ingress passage with a second internal chamber section characterized by ingress portions of the fluid discharge conduits. Advantageously, the fluid discharge conduits of the plurality of fluid discharge ports of the manifold are radially distributed about the first internal chamber portion thereof.

The valve body is adapted to be sealingly seated within the internal chamber so as to fluidly isolate the internal chamber sections. An end portion of the valve body includes a seal forming element thereabout, the seal forming element delimiting internal chamber portions of said manifold. The valve body includes a bore axially extending inwardly from a first end thereof for receipt of fluid from the fluid ingress port of the manifold, and a fluid egress passage in fluid communication with the bore for passage of received fluid to a select fluid discharge conduit of the fluid discharge conduits. Advantageously, a portion of the rotatable valve residing within the second internal chamber of the manifold includes a circumferential wall, desirably conically configured circumferential wall/wall segment, characterized by a surface having spaced apart longitudinal grooves to facilitate exhaust of a previously distributed discharge of received fluid returned to the assembly.

Advantageously, the second internal chamber section of the manifold includes a sloping circumferential wall characterized by orifices of fluid discharge conduits of the plurality of fluid discharge conduits. The rotatable valve body likewise includes a sloping circumferential wall segment coextensive and adjacent the sloping circumferential wall of the second internal chamber of the manifold. The slopes of these manifold and valve body portions are desirably similar, substantially similar, so as to effectively nestingly cooperate. The sloping circumferential wall segment of the valve body is characterized by an orifice of the fluid egress passage thereof, with rotation of the rotatable valve body thusly aligning the orifice of the fluid egress passage of the valve body with a select orifice of the orifices of the fluid discharge conduits of the plurality of fluid discharge ports. A face seal structure, associated with the fluid egress passage of the valve body, cooperatively engages the aligned select orifice of the orifices of the fluid discharge conduits of the plurality of fluid discharge ports to thereby establish a fluid path from the valve back through the manifold.

Sealed seating of the rotatable valve body within the internal chamber delimits gaps, i.e., plenums, in respect of each of the internal chamber sections of the manifold. A first gap/plenum is delimited by an end wall of the first internal chamber section and the first end of said rotatable valve body. This gap is associated with fluid passage from the manifold to the valve body. A second gap/plenum is delimited by a portion of the rotatable valve body and a portion of the second internal chamber section. More particularly, second gap is delimited by a further sloping circumferential wall segment of the valve body characterized by a slope that is less than the slope of the sloping circumferential wall of the second internal chamber of the manifold. This gap is associated with returned fluid exhaust passage from the manifold to the housing, effectively by passing the valve body.

Finally, it is to be noted that the contemplated valve assembly further includes, among other things, a drive assembly operably linked to the rotatable valve body so as to selectively position the fluid egress passage of the rotatable valve body relative to an orifice of a fluid discharge conduit of the plurality of fluid discharge conduits. The drive assembly is enclosed by a housing, with the housing operatively united to the manifold. More specific features and advantages obtained in view of the summarized features will become apparent with reference to the drawing figures and DETAILED DESCRIPTION wherein further advantageous particulars are set forth.

BRIEF DESCRIPTION OF THE DRAWINGS

All figures have been prepared, and are included to facilitate and/or enhance an understanding of the basic teachings of the contemplated embodiments, and/or the concepts underlying same, and are incorporated in and constitute a part of this specification. While the drawings illustrate embodiments and context with respect thereto, and together with the description serve to explain principles of embodiments, other embodiments and many of the intended advantages of the disclosed systems, subsystems, assemblies, subassemblies, apparatus, devices, mechanisms, methods, rubrics, protocols, etc. will be readily appreciated as they become better understood by reference to the following detailed description and figures. It is to be noted, as circumstances warrant, that the elements of the drawings are not necessarily to scale relative to each other, with like reference numerals designating corresponding similar parts/structures.

FIGS. 1-9 are provided herewith wherein:

FIG. 1 is a perspective view, fluid ingress/egress figure left, of an advantageous, non-limiting valve assembly for receipt and selective distributed discharge of a fluid;

FIG. 2 is an elevation view of the valve assembly of FIG. 1, fluid ingress/egress figure right;

FIG. 3 is an end view, right side, of the valve assembly of FIG. 2;

FIG. 4 is a plan view, top view of the valve assembly of FIG. 2;

FIG. 5 is an exploded view of the valve assembly of FIG. 2;

FIG. 6 is a cut-away view of the valve assembly in keeping with the assembly depiction of FIG. 1 wherein portions of the manifold and housing have been removed to illustrate underlying particulars;

FIG. 7 is a cross sectional view of the valve assembly in keeping with the assembly depiction of FIG. 1;

FIG. 8 is a perspective view of the valve body of the valve assembly in keeping with the assembly depiction of FIG. 5; and, FIG. 9 depicts, side elevation, a disintegrated view of the manifold and valve body, each element shown in section.

DETAILED DESCRIPTION

Figure 1:
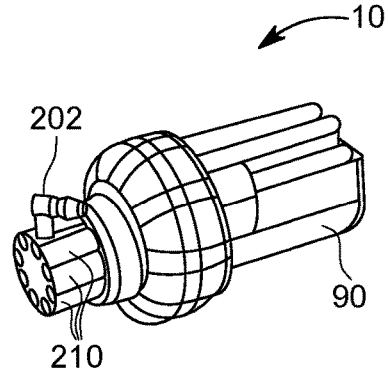

In advance of setting out particulars/select particulars for the contemplated system/device and method(s), an overview of the disclosure is hereinafter provided along with contextual utility for the instant device. It is to be noted that the overview is intended as a preview or framework related to Applicant's work and is not to be construed as limiting in any way.

An advantageous, non-limiting fluid control valve module (i.e., valve assembly) for selective distributed discharge of a fluid received thereby is provided for in connection to the several views thereof FIGS. 1-4. Components and/or subassemblies thereof are illustrated with relationships there between/among appreciated, exploded view FIG. 5, with the components and/or subassemblies thereof, as the case may be, illustrated in operative combination in connection to the assembly cut-away and/or sectional views of FIGS. 7 & 8, interrelationships between, among and for the components thusly set out. Finally, a disintegrated view of the manifold and valve body, each element shown in section, is provided FIG. 9 in furtherance of understanding/appreciating the cooperative engagement of the elements and the resulting fluid flow path(s) as to the combination.

Contextually, it is contemplated that a pressurized fluid, for example and without limitation air, be supplied to the contemplated module by a pressurized air source, for example and without limitation, a compressor. Advantageously, the instant fluid control valve module is operably combinable with a controller characterized by a processor, and as circumstances warrant, actuators or the like to selectively deliver compressed air from a source of compressed air to the valve assembly for select distributed discharge in furtherance of application objectives. Notionally, the module sequentially delivers pressurized fluid to a work piece via a plurality of fluid discharge conduits unitable with each of the portions of the work piece, a prior fluid charge returning to the module from one work piece portion via the fluid discharge conduit that delivered its fluid charge while a fluid charge is delivered to another work piece portion via cooperative association of another of the fluid discharge conduits with it vis-a-via the module components.

An illustrative application for the instant fluid control valve module is a methodical, select, sequential delivery of pressurized air to a chamber of a multi-chambered article of manufacture, for example and without limitation, a substrate of a pad, cushion, or mattress. By way of illustration only, and in the context of a cushion, pressurized air at about 1-30 psi and 1-50 liters/min are readily received by the instant valve assembly, with operational departures readily achieved and/or achievable via, as circumstances warrant, via the instant valve assembly or commensurate adaptation thereof. Having charged a first chamber, a second chamber is charged with the first chamber discharging its charged fluid for a returned exhaust to the module.

The instant disclosure next proceeds with particulars for the illustrated non-limiting module and its components. Thereafter, a functional or operational overview is taken up.

Figure 5:
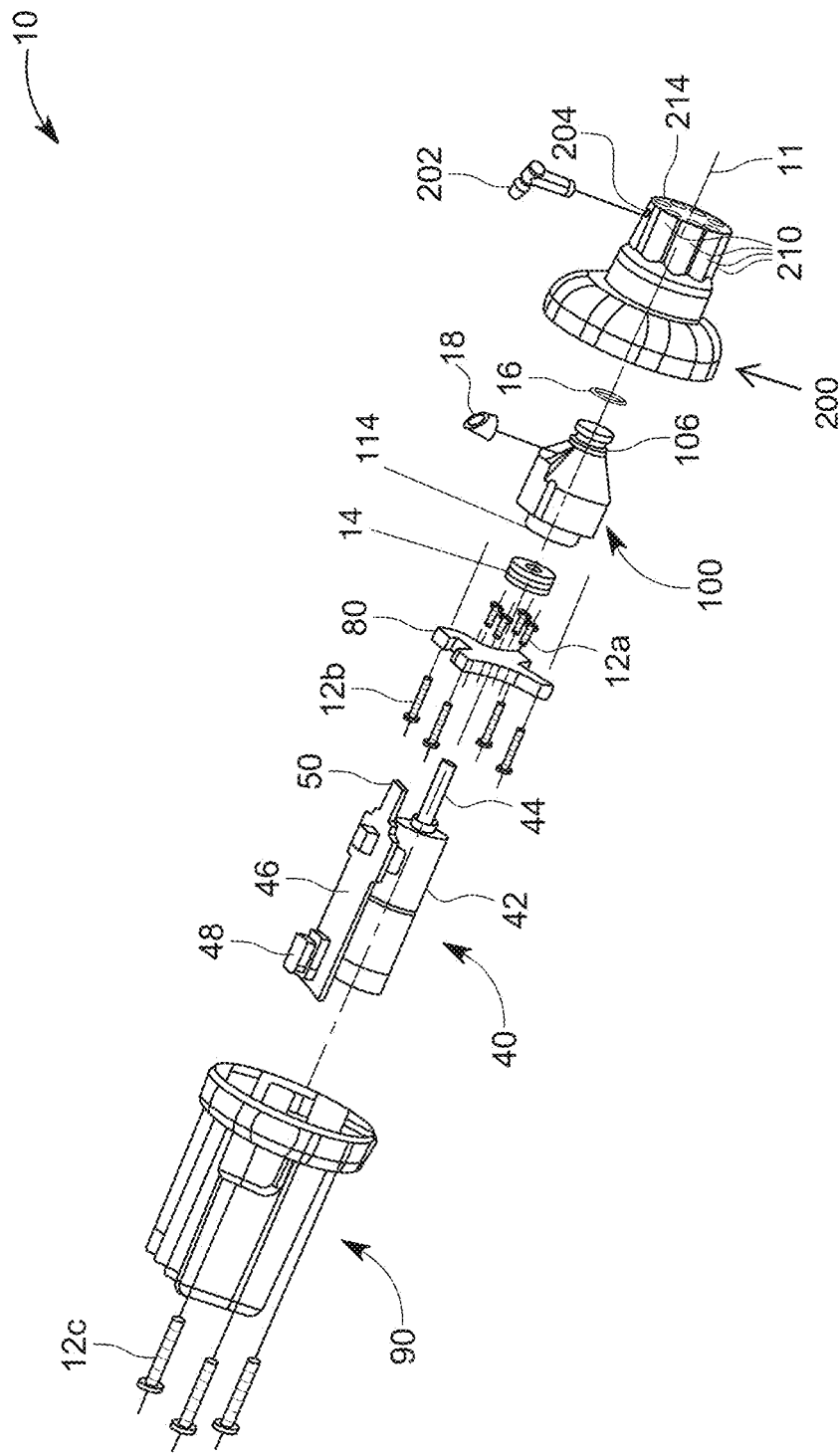

With initial reference to FIGS. 1-5, a valve assembly 10 is generally shown, the components thereof appreciated with reference to the exploded view of FIG. 5. Notionally, the module is characterized by, as shown FIG. 5, a valve body 100, a/k/a diverter or swivel, and a drive assembly 40 operatively linked thereto for select rotation of the valve body, a manifold 200 within which the valve body is rotatingly received, housed or seated, a bracket 80 for integrally uniting, in combination, the drive assembly and valve body to/with the manifold, and a housing 90 within which the drive assembly resides, the housing and manifold generally united as indicated to operatively contain the valve body and drive assembly.

As is illustrated FIG. 5, a variety of fasteners 12a, 12b, 12c unite: bracket 80 to drive assembly 40 (12a); the combination of bracket 80 and drive assembly 40, in operative combination with valve body 100, to the manifold 200 (12b); and, housing 90 to manifold 200 (12c), more particularly as shown, the combination of bracket 80, drive assembly 40 and manifold 200. Moreover, a thrust bearing 14 is provided intermediate bracket 80 and valve body 100 to facilitate driven rotation of the valve body via the drive assembly as will be later described. Finally, in relation to valve body 100, it is equipped with an O-ring 16 and a face seal 18 as will likewise be later taken up.

Returning briefly to FIGS. 1-4 in advance of taking up primary module features such as, and without limitation, drive assembly 40, valve body 100 and manifold 200, two preliminary manifold observation are warranted to better support understanding of feature relatedness. While the manifold and housing are indicated, absent are the housed components illustrated in of the exploded view of FIG. 5.

Figure 2:
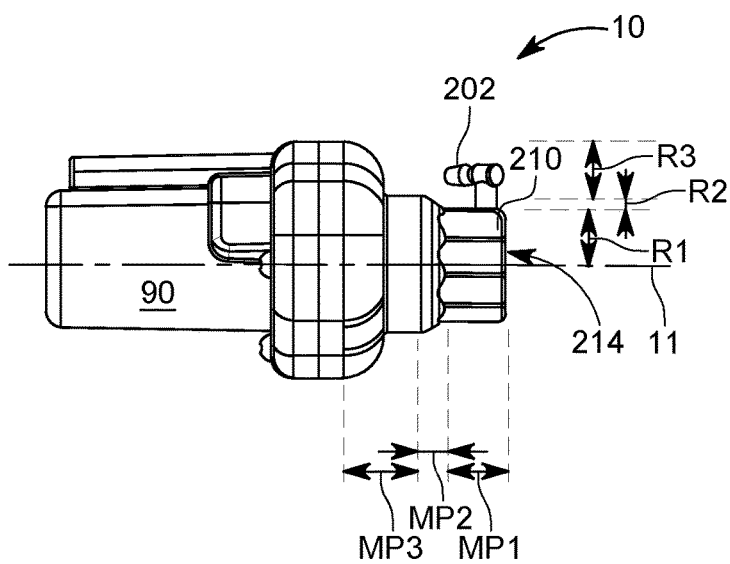
Figure 3:
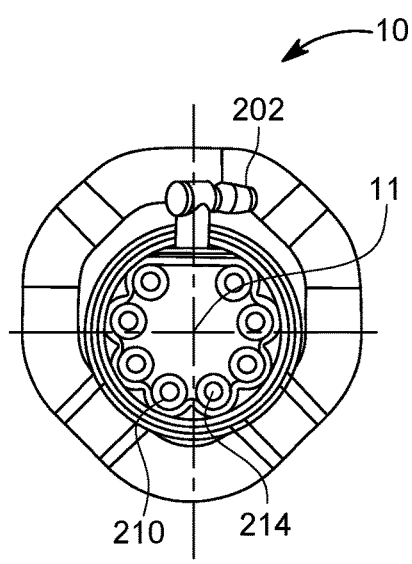
Figure 4:
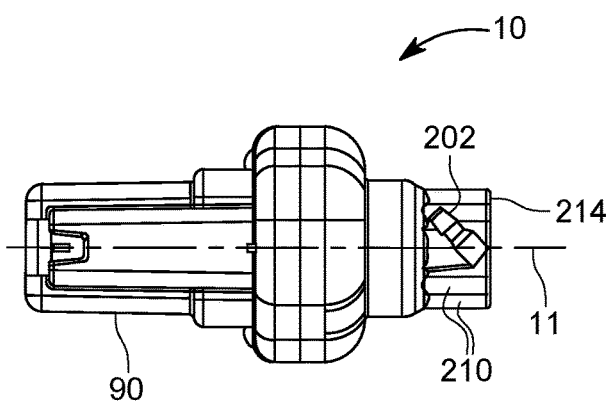

First, to facilitate understanding and appreciation of the instant fluid control valve module, three manifold portions are noted, namely, a first, second, and third manifold portions (MP1, MP2, MP3) as indicated FIG. 2. MP1 is a free end or distal portion; MP3 is a proximal portion, opposite MP1, with a proximal end segment operatively united with/ unitable to the housing, and MP2 is intermediate MP1 and MP3. Each of these manifold portions may be fairly characterized by a corresponding radial dimension R1, R2 and R3 referenced from a module centerline 11 as shown. These manifold portions and associated radii are likewise represented in connection to the sectional view of the manifold of FIG. 9 wherein manifold chamber particulars are depicted.

Second, select features of the manifold visible in the instant views are to be noted, namely, a fluid ingress fitting 202 received by a fluid ingress orifice 204 of a fluid ingress passage 206 is associated with MP1, a plurality of radially spaced apart longitudinally extending fluid discharge conduits 210 traverse MP1 and MP2, each having a fluid ingress orifice associated with MP2 and fluid egress orifice 214 associated with MP1. As will be later taken up, the valve body, owing to its configuration and selective rotation, operatively combines with an internal chamber of the manifold such that fluid from the fluid ingress passage of the manifold passes into the valve body and to a valve egress port that is sealingly registerable with a select one of the plural fluid discharge conduits of the manifold with fluid exit via the egress orifice thereof.

With renewed reference to FIG. 5, drive assembly 40 includes various components to accommodate operation of the module, including a motor 42 which is specifically designed to drive a drive shaft 44. As illustrated, motor 42 is mounted to bracket 80 in order to maintain positioning and to provide support and stability. Bracket 80 also supports and aligns/maintains alignment of an electronics board, e.g., circuit board 46 of the assembly.

Drive shaft 44 provides (i.e., transfers) rotational force to the valve body in furtherance of its select seated positioning relative to the manifold. As will be appreciated, valve body 100 is physically united with drive shaft 44 thus causing simultaneous movement of both components. Drive assembly 40 further includes a control signal receptacle 48 (e.g., a connector jack, or other similar/suitable electronics connection mechanism), and a position sensor 50. Operation of motor 42 is controlled by other components contained on the circuit board 46 (e.g., a processor) so as to provide appropriate positioning of valve body 100.

Figure 6:
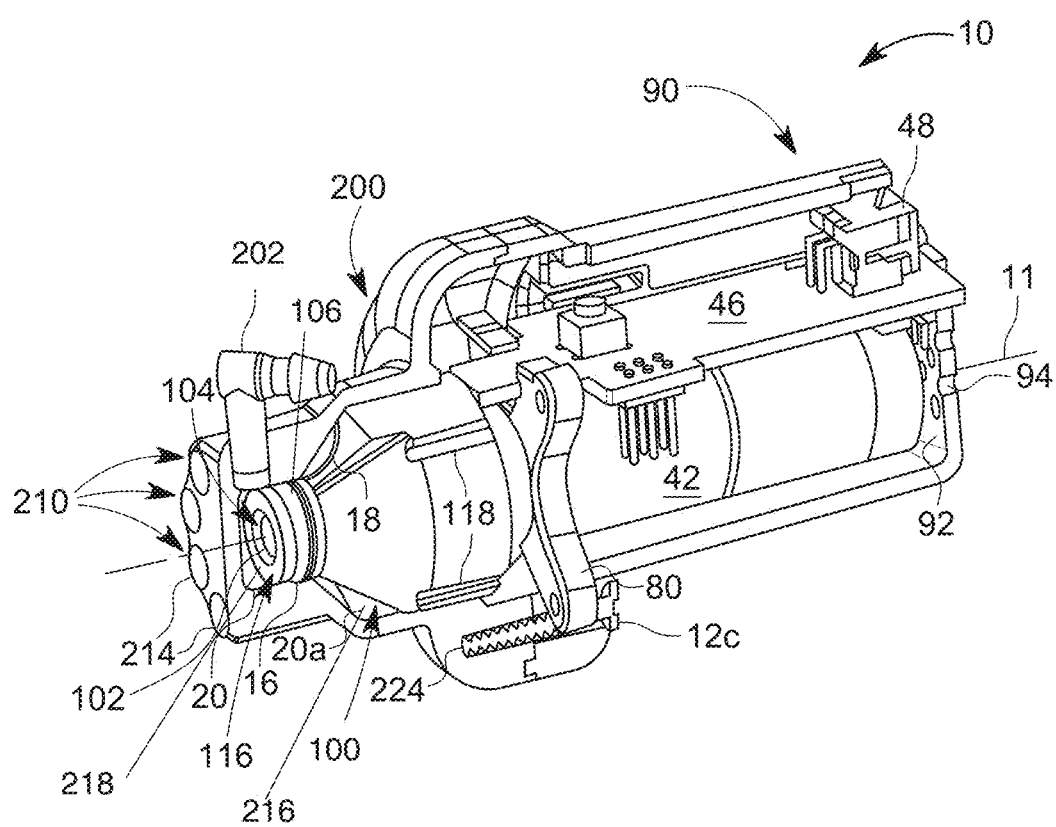
Figure 7:
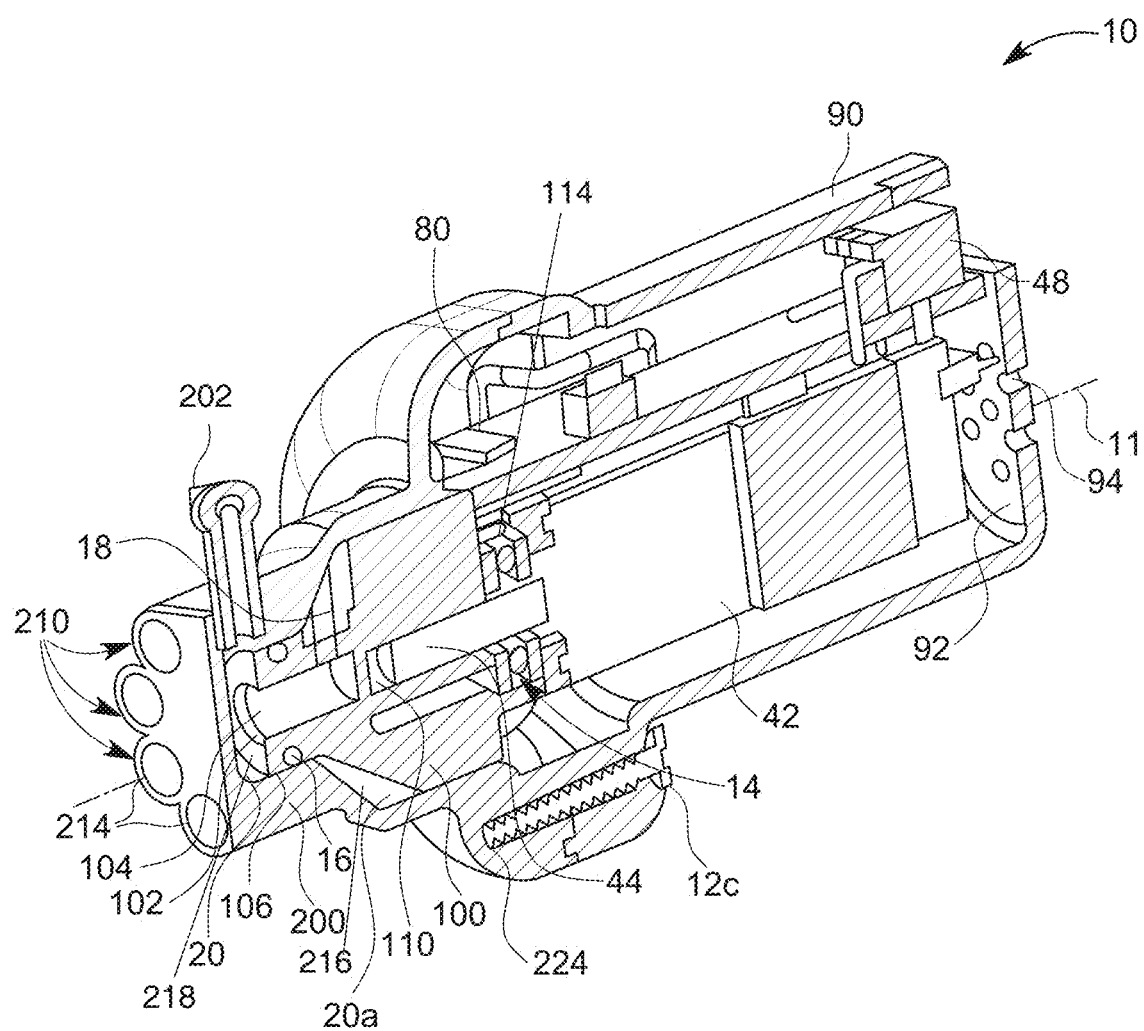
Figure 8:
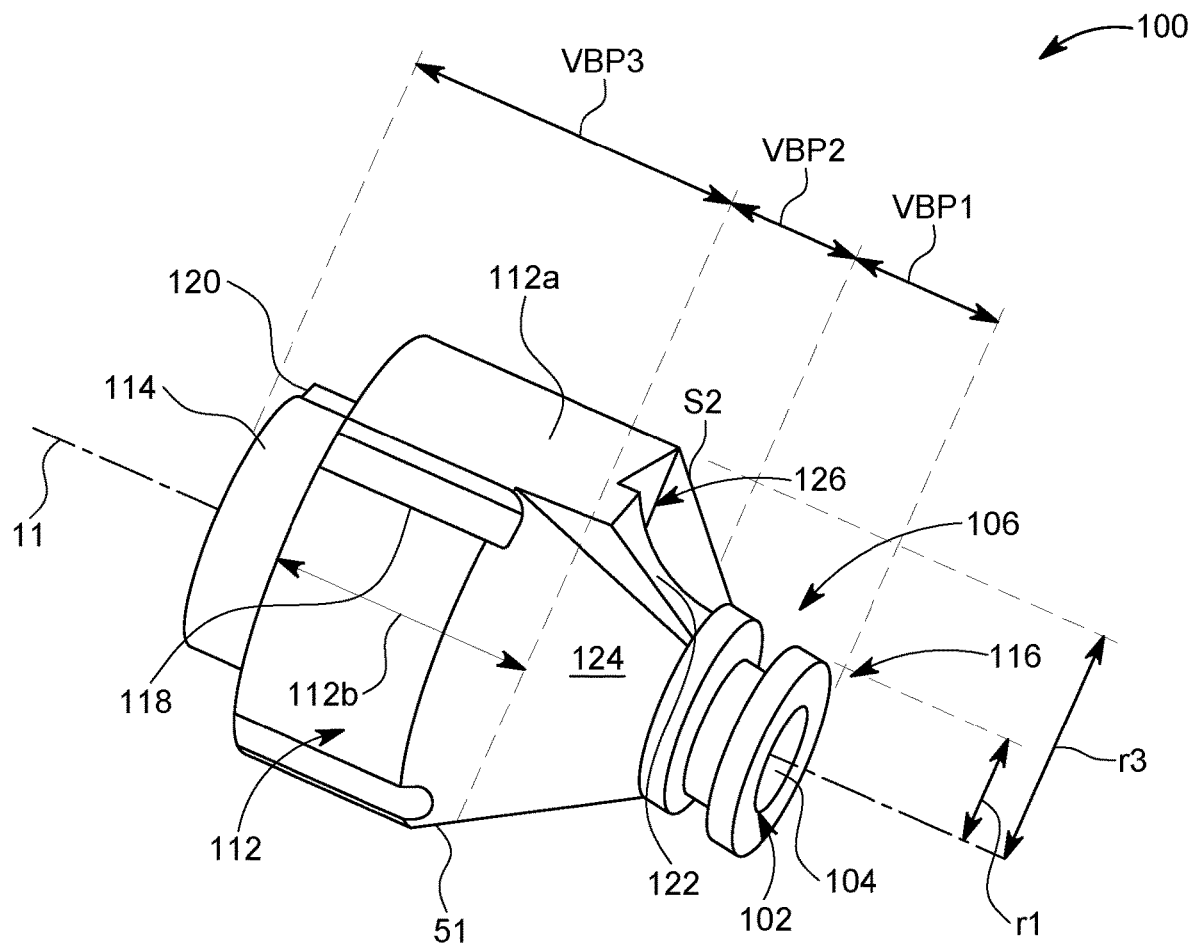

With general reference to FIGS. 5-9, there is show an advantageous, non-limiting valve body 100 (FIGS. 5, 6 & 8). Sections of the valve body are specifically depicted FIGS. 7 & 9.

Figure 9:
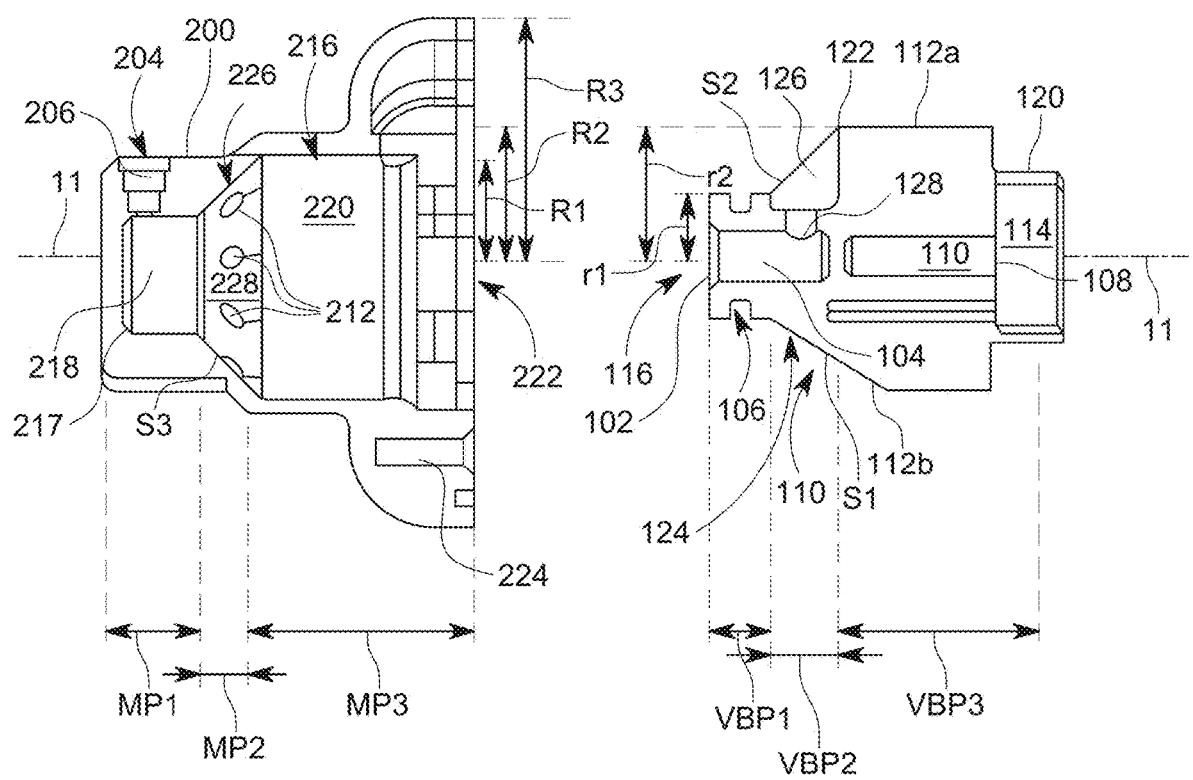

As was the case with the manifold, to facilitate understanding and appreciation of the instant fluid control valve module, three valve body portions are noted with reference to FIGS. 8 & 9, namely, first, second, and third valve body portions (VBP1, VBP2, VBP3). VBP1 is a free end or distal portion; VBP3 is a proximal portion opposite VBP1, and VBP2 is intermediate VBP1 and VBP3. Valve body portions VBP1 & VBP3 may be fairly characterized by a corresponding radial dimension r1 and r3, referenced from module centerline 11, as shown FIGS. 8 & 9. As will be later taken up, portions of the valve body correspond and/or functionally relate to portions of the manifold. It is to be noted that the valve body is illustrated, FIGS. 6 & 7, in a parked or home position in relation to the manifold (note also FIG. 3).

VBP1 is generally cylindrical, and is fairly characterized by r1, a fluid ingress orifice 102 of an axially extending bore or cavity 104, an initial segment of the bore or cavity, and a grooved circumferential wall 106 (FIGS. 8 & 9). O-ring 16 resides within grooved circumferential wall 106 (FIG. 7) and cooperatively engages a portion of the manifold so as to partition a chamber thereof.

VBP3 is likewise generally cylindrical, and is fairly characterized by r3, an orifice 108 of an axially extending bore 110, and an initial segment of the bore or cavity which cooperatively receives output shaft 44 of motor 42 of drive assembly 40 (see e.g., FIG. 9). This valve portion is further characterized by primary and secondary circumferential walls 112, 114, secondary circumferential wall 114 opposite a free end 116 of valve body 100 (see e.g., FIG. 8).

Primary circumferential wall 112 is fairly characterized by first and second primary wall segments 112a, 112b. First primary wall segment 112a circumferentially extends between spaced apart adjacent longitudinally extending surface grooves 118 positioned at the 11 and 1 o'clock positions (i.e., from 11, through 12 to the 1 o'clock position) as is appreciated/shown with reference to FIGS. 5, 6 & 8 as per a free end view of the valve body. This segment is characterized by r3 and may suitably, but not necessarily comprise an arc segment corresponding to an angle of about 60 degrees. Second primary wall segment 112b extends between spaced apart longitudinally extending surface grooves 118 positioned at the 1 and 11 o'clock positions (i.e., from 1, through 6 to the 11 o'clock position) as is likewise appreciated with reference to FIGS. 5, 6 & 8. This segment is characterized by a decreasing radius so as to delimit a conical tapered section of select slope (S1) have an arc segment complementary to that associated with first primary circumferential wall segment 112a.

Secondary circumferential wall 114 of this body portion delimits a proximal endmost valve body feature and advantageously includes a sensor indicator 120 for operative combination with position sensor 50 to aid valve body position sensing in furtherance of sought after precise positioning (i.e., registration) of a fluid passage or conduit of the valve body to/with a corresponding fluid passage or conduit of the manifold via control electronics of the drive assembly. As is readily appreciated with reference to FIG. 5 & FIG. 7, thrust bearing 14 is circumscribed by secondary circumferential wall 114.

Primary circumferential wall of this body portion, more particularly first primary circumferential wall segment 112a, includes longitudinally extending spaced apart surface grooves or slots 118, FIGS. 6 & 8, for directed exhaust of returned fluid from a work piece between the valve body and manifold via passage there through. Housing 90 includes an end wall 92 characterized by vents/apertures 94 as show FIGS. 6 & 7 to vent the directed exhaust from the device. While four such spaced apart grooves are contemplated, e.g., at 1, 5, 7 and 11 o'clock end view positions, it is not intended as limiting. Moreover, alternate circumferential wall adaptation(s) may likewise be suitable and/or desirable to/for the establishment of suitable exhaust channels or passages between the valve body and manifold.

VBP2 is notionally cylindrical, and generally characterized by first and second conical segments 122, 124. First conical segment 122 is adjacent first primary wall circumferential segment 112a of VBP3 and extends therefrom towards and to VBP1 at a select slope (S2), the segment narrowing in width in a distal direction as is appreciated with reference to FIG. 8. This conical segment includes a surface cavity 126 and a radial bore 128 extending therefrom, radial bore 128 intersecting axial bore 104 of VBP1 as best seen FIG. 9 so as to fluidly unite these structures. Face seal 18 is seated in radial bore 128, see FIGS. 5 & 6.

Second conical segment 124 of this body portion is essentially and effectively an extension of the conical segment or portion of VBP3, namely, second primary circumferential wall segment 112b thereof and is thusly characterized by select slope S1 thereof. It is to be noted that slope S2 associated with the taper of second conical segment 124 is greater than slope S1 associated with the taper of first conical segment 122 (see e.g., FIG. 9). This first conical segment, as the second conical segment, extends distally to VBP1.

With general reference to FIGS. 5-7 & 9, there is show advantageous, non-limiting manifold 200 (FIGS. 5, 6 & 8), a section thereof specifically depicted FIG. 9. In addition to the manifold features set out in connection to the depictions of FIGS. 1-4, the manifold per se is further characterized by an interior compartment 216, for example when operatively combined with the valve body, a chambered compartment delimiting first and second chamber sections 218, 220, and an ingress opening 222 for passage of valve body 100 (FIG. 9) and receipt of same by manifold 200, ingress opening 222 including fastener anchors 124 to integrate each of bracket 80 and housing 90.

MP1 is fairly characterized by first chamber section 218 for receipt/initial receipt of fluid introduced to the module via fitting 102, see especially FIG. 9. First chamber section or compartment 218 is circumscribed by distal segments of the plurality of fluid egress conduits 210 as best seen in either of FIG. 6 or FIG. 7, and further appreciated with reference to FIG. 9.

MP3 is fairly characterized by ingress opening 222. The circumferential wall of ingress opening 222 is adapted to include radially distributed fastener anchors 224 for receiving bracket 80 and housing 90 related fasteners 12b 12c in furtherance of uniting those elements to/with the manifold.

MP2 is fairly characterized by a transition segment 226 between first and second chamber sections 218, 220, and segments of fluid discharge conduits 210. As to transition segment 126, it comprises a conical tapered transition segment having a select increasing slope (S3) from MP1 towards MP3 (FIG. 9), slope S3 in keeping with slope S2 of first primary wall segment 112a of VBP3, as is evidenced with reference to either of FIG. 6 or FIG. 7, such that there is substantial conforming engagement between the transition segment of the second manifold body portion and the primary circumferential segment of the third valve body portion. A surface 128 of transition segment 126 includes orifices 212 of the fluid discharge conduits 210 as best seen FIG. 9.

As has been alluded to, there exists a correspondence and/or relatedness for portions of the manifold and valve body. In short, the valve body is seated in respect of the manifold so as to form operable combinations of, or cooperative engagements between/among, for example, surface features of the valve body and interior/chamber features of the manifold, illustratively and as will be described hereinafter, features of VBP1 with features of MP1, and features of VBP2 with features of MP2 in keeping with the depictions of FIGS. 6 & 7.

With continued reference to FIGS. 6 & 7, the integrated union of the fluid control valve module components of FIG. 5 are generally appreciated. As a preliminary matter, several unions are to be noted, for example, housing 90 with manifold 200 via fasteners 12c, motor 42 and correspondingly drive assembly 40 to bracket 80 (FIG. 7), valve body 100 to motor drive shaft 44 via receipt of same in axial bore 110, and valve body 100, in combination with drive assembly 40, with manifold 200. As to the operative combination of the valve body with the manifold, several relationships are further appreciated with reference to the instant depictions.

First, first chamber section 218 of manifold 200 is delimited by engagement of o-ring 16 of grooved circumferential wall 106 of valve body 100 with a portion of interior compartment 216. Moreover, there exists a gap or plenum 20 between an end wall 217 of interior compartment 216 and free end 116 of valve body 100.

Second, face seal 18 of surface cavity 126 of first conical segment of the second valve body portion is positionable, via rotation of the valve body by the motor, from the parked or home position of the valve body relative to the manifold (FIGS. 6 & 7) for registration with an orifice of a fluid discharge conduit of the plurality of fluid discharge conduits owing to substantially conforming portions of the valve body in relation to the manifold, namely, first primary wall segment 112a of VBP2 and transition segment 226 of MP2, each of which characterized by select slope S2. Via such structures and alignment, a fluid path is delimited as best seen FIG. 7, namely passage of fluid from fluid ingress fitting 202 into first chamber section 218, to and through axial bore 104 and radial bore 128 for subsequent introduction into a fluid discharge conduit of the plurality of fluid discharge conduits and thereafter to a select work piece portion.

Third, and finally, owing to the conical circumferential wall portion or segment of the valve body, more particularly its slope S2, in relation to a portion of a wall of the interior chamber, a gap or plenum 12a is delimited within second interior chamber section 220 of the manifold. More particularly, gap 12a results from slope S2 of the conical circumferential wall portion or segment of the valve body being mis-matched with slope S1 of transition segment 228 of the manifold. Functionally, the gap or plenum receives fluid returned to the assembly from a portion of a work piece via a once prior discharging fluid discharge conduit. Gap 12a, in combination with valve body surface grooves or slots 118, permit passage of returned fluid/work piece exhaust to housing 90 for discharge via apertures 94 of end wall 92.

Various embodiments of the invention have been described above for purposes of illustrating the details thereof and to enable one of ordinary skill in the art to make and use the invention. The details and features of the disclosed embodiment or embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed is:

1. A valve assembly for select distributed discharge of received fluid in a predetermined manner comprising:
 a. a manifold having an internal chamber, a fluid ingress passage for receipt of fluid from a fluid source, and a plurality of fluid discharge conduits, said fluid ingress passage and said plurality of fluid discharge conduits in fluid communication with said internal chamber, a first internal chamber section characterized by said fluid ingress passage, a second internal chamber section characterized by ingress portions of said plurality of fluid discharge conduits; and,
 b. a rotatable valve body adapted to be sealingly seated within said internal chamber so as to fluidly isolate said second internal chamber of said manifold from said first internal chamber of said manifold, said rotatable valve having a bore axially extending inwardly from a first end thereof for receipt of fluid from said fluid ingress port of said manifold, and a fluid egress passage in fluid communication with said bore for passage of received fluid to a single select fluid discharge conduit of said plurality of fluid discharge conduits of said manifold in furtherance of select distributed discharge of received fluid from the assembly.

2. The valve assembly of claim 1 wherein said second internal chamber section of said manifold includes a sloping circumferential wall characterized by orifices of fluid discharge conduits of said plurality of fluid discharge conduits, and wherein said rotatable valve body includes a sloping circumferential wall segment coextensive and adjacent said sloping circumferential wall of said second internal chamber of said manifold, said sloping circumferential wall segment characterized by an orifice of said fluid egress passage of said valve body, rotating said rotatable valve body aligning said orifice of said fluid egress passage of said valve body with a single select orifice of said orifices of the fluid discharge conduits of said plurality of fluid discharge ports.

3. The valve assembly of claim 1 wherein an end portion of said valve body includes a seal forming element thereabout, said seal forming element delimiting internal chamber portions of said manifold.

4. The valve assembly of claim 1 wherein sealed seating of said rotatable valve body within said internal chamber delimits a plenum between an end wall of said first internal chamber section and said first end of said rotatable valve body.

5. The valve assembly of claim 1 wherein sealed seating of said rotatable valve body within said internal chamber delimits a plenum between a portion of said rotatable valve body and a portion of said second internal chamber section.

6. The valve assembly of claim 1 wherein sealed seating of said rotatable valve body within said internal chamber delimits a plenum between a portion of said rotatable valve body and a portion of said second internal chamber section, said plenum opposite a point of cooperative alignment of said fluid egress passage of said rotatable valve body with a single select fluid discharge conduit of said plurality of fluid discharge conduits.

7. The valve assembly of claim 1 wherein a portion of said rotatable valve residing within said second internal chamber of said manifold includes a circumferential wall characterized by a surface having spaced apart longitudinal grooves to facilitate exhaust of a previously distributed discharge of received fluid returned to the assembly.

8. The valve assembly of claim 1 wherein a portion of said rotatable valve residing within said second internal chamber of said manifold includes a conical circumferential wall characterized by a surface having spaced apart longitudinal grooves to facilitate exhaust of a previously distributed discharge of received fluid returned to the assembly.

9. The valve assembly of claim 1 wherein said fluid discharge conduits of said plurality of fluid discharge ports of said manifold are radially distributed about said first internal chamber portion thereof.

10. A valve assembly for select distributed discharge of received fluid comprising:
a. a rotatable valve body having first, second and third axially extending body portions, a fluid receiving bore axially extending from said first body portion into and terminating in said second body portion, and a fluid discharge bore radially extending in said second body portion and in fluid communication with said fluid receiving bore, said second body portion including first and second circumferential wall segments, said first circumferential wall segment including a conical segment extending between said first and third valve body portions at a first select slope, said second circumferential wall segment comprising cylindrical and conical segments, said conical segment extending from said cylindrical segment to said first valve body portion at a second select slope and having a surface cavity in fluid communication with said fluid discharge bore; and,
b. a manifold having first, second and third axially extending portions, a chamber within said first and second manifold portions so as to thereby delimit first and second chamber portions corresponding thereto, a fluid ingress conduit radially extending in said first manifold portion and in fluid communication with said chamber at said first chamber portion, a plurality of fluid egress conduits axially extending from said first manifold portion and in fluid communication with said chamber at said second chamber portion for select receipt of fluid from said valve body wherein first valve body portion is in sealed engagement with said chamber within said first manifold portion so as to delimit a fluid ingress chamber compartment, said rotatable valve rotatable so as to align said cavity of said conical section of said second circumferential wall segment of said second valve body portion in furtherance of select distributed discharge of fluid therefrom.

11. A diverter assembly for use in directing a fluid from an input port to a selected one of a plurality of output ports comprising: a housing having an inner chamber in communication with the inlet port, the housing including a plurality of fluid egress conduits, each fluid egress conduit characterized by an inlet orifice and in fluid communication with an output port of the plurality of output ports, the inlet orifices positioned within the inner chamber of the housing, each of the outlet ports of the plurality of outlet ports in fluid communication with a respective one of the plurality of fluid egress conduits; and a rotatable valve positioned within the inner chamber, the valve having a valve input coupled to the inlet port and a valve output positionable at a predetermined one of a plurality of locations corresponding to each inlet orifice of each fluid egress conduit of the plurality of fluid egress conduits of the housing in furtherance of discharging the directed fluid from the inlet port to a select single outlet port.

12. The assembly of claim 11 wherein the rotatable valve is driven by a controllable actuator which is capable of causing the valve to be positioned at one of the plurality of locations.

* * * * *